US 8,120,994 B2

(12) United States Patent
Ding et al.

(10) Patent No.: US 8,120,994 B2
(45) Date of Patent: *Feb. 21, 2012

(54) DIGITAL TRANSCRIPTION SYSTEM UTILIZING ACOUSTICAL DETECTORS HAVING APERTURES WITH A VERTICAL ORIENTATION RELATIVE TO THE WORK SURFACE

(75) Inventors: Yao Ding, Sunnyvale, CA (US); Jacob Harel, Redwood City, CA (US); Timothy Alan Misko, Cupertino, CA (US)

(73) Assignee: Luidia, Inc., San Carlos, CA (US)

( * ) Notice: Subject to any disclaimer, the term of this patent is extended or adjusted under 35 U.S.C. 154(b) by 349 days.

This patent is subject to a terminal disclaimer.

(21) Appl. No.: 12/431,708

(22) Filed: Apr. 28, 2009

(65) Prior Publication Data

US 2010/0271906 A1   Oct. 28, 2010

(51) Int. Cl.
*G01S 3/80* (2006.01)
*G06F 3/043* (2006.01)

(52) U.S. Cl. ..... 367/128; 367/124; 367/127; 178/18.04; 178/19.02

(58) Field of Classification Search .................. 367/124, 367/127, 128; 178/18.04, 19.02
See application file for complete search history.

(56) References Cited

U.S. PATENT DOCUMENTS

| 3,838,212 | A | * | 9/1974 | Whetstone et al. | 178/18.04 |
| 4,246,439 | A | * | 1/1981 | Romein | 178/19.02 |
| 4,337,379 | A | * | 6/1982 | Nakaya | 381/408 |
| 4,758,691 | A | * | 7/1988 | De Bruyne | 178/18.09 |
| 4,777,329 | A | * | 10/1988 | Mallicoat | 178/19.02 |
| 4,814,552 | A | * | 3/1989 | Stefik et al. | 178/19.02 |
| 5,239,139 | A | * | 8/1993 | Zuta | 178/19.02 |
| 5,587,560 | A | * | 12/1996 | Crooks et al. | 178/18.03 |
| 6,151,014 | A | * | 11/2000 | Zloter et al. | 345/177 |
| 6,265,676 | B1 | * | 7/2001 | Zloter et al. | 178/19.01 |

(Continued)

FOREIGN PATENT DOCUMENTS

JP    03-138720 A    6/1991

(Continued)

OTHER PUBLICATIONS

A C Berners, J G Webster, C J Worringham and G E Stelmach. "An ultrasonic time-of-flight system for hand movement measurement" Physiol. Meas. 1995 vol. 16 No. 4 p. 203-211.*

(Continued)

*Primary Examiner* — Thomas Tarcza
*Assistant Examiner* — James Hulka
(74) *Attorney, Agent, or Firm* — Calvin B. Ward

(57) ABSTRACT

A pen transcription system and method for using the same are disclosed. The pen transcription system includes a receiver having first and second acoustical sensors mounted on a planar base and separated from one another, an EM detector, and a controller. The first and second acoustical sensors detect an acoustical signal emitted by a moveable signal source. The EM detector detects an EM signal that is synchronized with the acoustical signal. The controller measures the difference in time of detection between the EM signal and the acoustical signals detected by the first and second acoustical sensors. The acoustical sensors include a detector and a housing surrounding the detector, the housing having an aperture defined by an axis. The acoustical sensor has a reception function that is symmetrical about the axis and the axis is substantially perpendicular to the base surface.

23 Claims, 8 Drawing Sheets

U.S. PATENT DOCUMENTS

| | | | |
|---|---|---|---|
| 6,414,673 B1* | 7/2002 | Wood et al. | 345/173 |
| 6,633,280 B1* | 10/2003 | Matsumoto et al. | 345/173 |
| 6,654,008 B2 | 11/2003 | Ikeda | 345/179 |
| 6,703,570 B1* | 3/2004 | Russell et al. | 178/19.03 |
| 6,724,371 B1* | 4/2004 | Shenholtz et al. | 345/177 |
| 2002/0060665 A1* | 5/2002 | Sekiguchi et al. | 345/157 |
| 2003/0066692 A1* | 4/2003 | Devige et al. | 178/18.04 |
| 2004/0144575 A1* | 7/2004 | Zloter et al. | 178/19.02 |
| 2004/0160429 A1* | 8/2004 | Blake et al. | 345/179 |
| 2004/0169439 A1* | 9/2004 | Toda | 310/328 |
| 2005/0012724 A1* | 1/2005 | Kent | 345/177 |
| 2005/0150697 A1* | 7/2005 | Altman et al. | 178/19.02 |
| 2005/0215907 A1* | 9/2005 | Toda et al. | 600/459 |
| 2006/0161992 A1* | 7/2006 | Kempf | 726/34 |
| 2006/0273696 A1* | 12/2006 | Toda | 310/348 |
| 2007/0188477 A1* | 8/2007 | Rehm | 345/179 |
| 2008/0084789 A1 | 4/2008 | Altman | 367/127 |
| 2008/0165162 A1* | 7/2008 | Zloter et al. | 345/179 |

FOREIGN PATENT DOCUMENTS

| | | |
|---|---|---|
| WO | WO 00-2125 A1 | 4/2000 |

OTHER PUBLICATIONS

International Search Report, PCT/US2010/025981, Oct. 21, 2010, all pages.

* cited by examiner

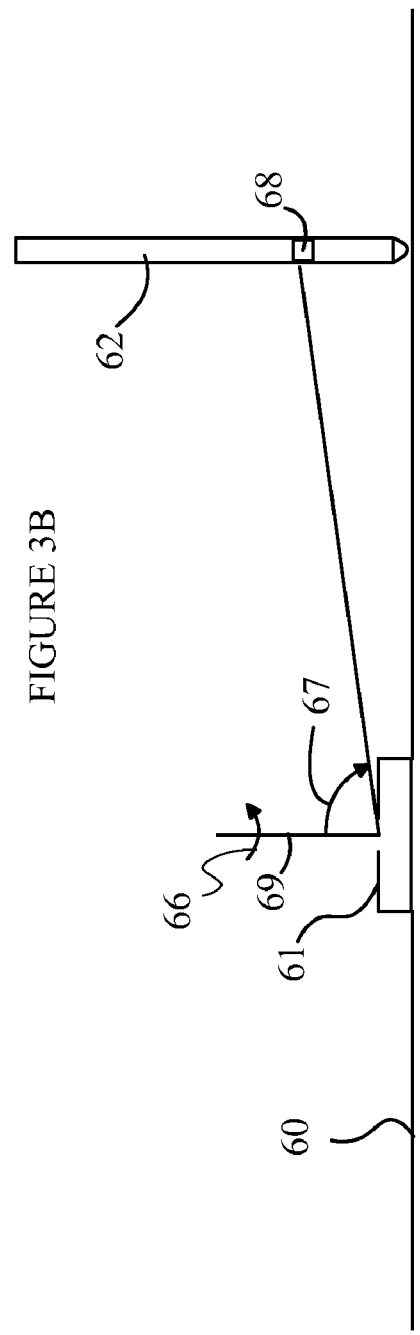
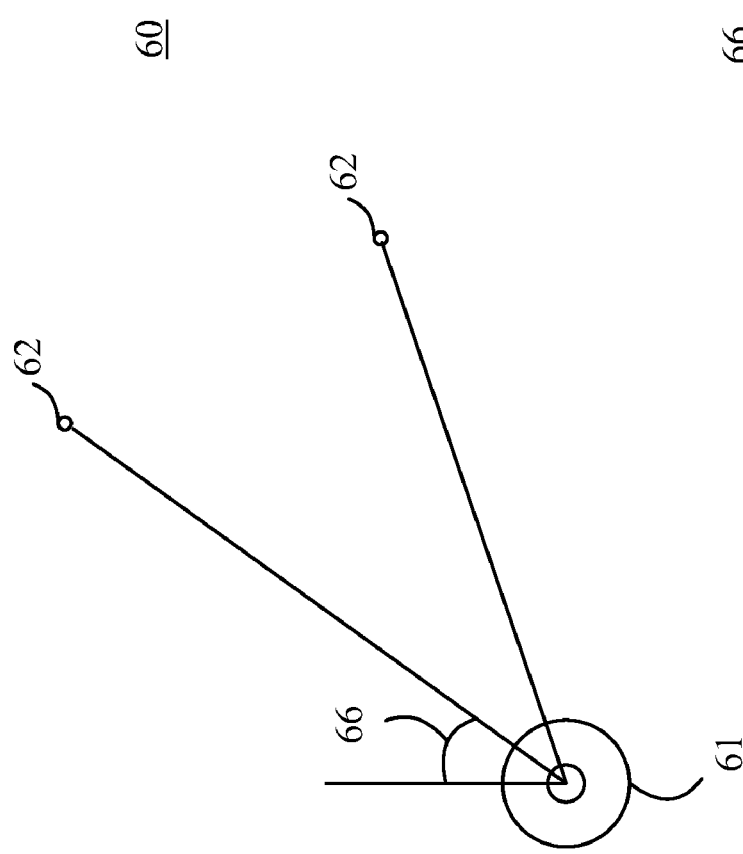
FIGURE 3A
FIGURE 3B

DIGITAL TRANSCRIPTION SYSTEM UTILIZING ACOUSTICAL DETECTORS HAVING APERTURES WITH A VERTICAL ORIENTATION RELATIVE TO THE WORK SURFACE

BACKGROUND OF THE INVENTION

Acoustic-based distance measuring systems have been used to compute the position of a data entry object in a writing field for some time. For example, schemes that track and record the position of a pen on a white board are commercially available. As the user writes on the white board, the transcription system determines the location of the pen on the board and records the location for later use.

In such systems, a conventional marking pen of the type used with white boards is inserted into a housing that includes an acoustical transmitter and an infrared transmitter. As the user writes on the white board in the conventional manner, the transmitter sends a combination of acoustical and infrared pulses. Two receivers that are separated in space receive the signals generated by the housing. Each receiver measures the time difference between the time of arrival of the infrared pulse and the acoustical pulse to determine the distance of the housing from that receiver. These distance measurements are then combined to determine the position of the housing relative to the receivers.

Infrared is used for the light signals to avoid problems with background light in the area of use. The acoustical signals are typically in the ultrasound range so that the signals are beyond the human audible range. In addition, the higher frequencies provide better spatial resolution. Each acoustical receiver is typically constructed from a microphone such as a ceramic piezo microphone, PVDF films, a condenser microphone, an electrets condenser microphone (ECM), a moving coil microphone, etc.

Unfortunately, the sensitivity of these devices as utilized in prior art systems is not completely omni-directional at ultrasound frequencies. The variation in angle with respect to each sensor over the range of positions of the pen on the surface can be relatively large. Hence, angular variation in the gain of the ultrasound receivers can lead to increased errors due to noise and variation in the trigger point on the ultrasound pulse as a function of angle. The latter type of error results in an error in the perceived delay time of the ultrasound signal, and hence, an error in the calculated distance from the sensor to the pen. In the extreme case, the microphone can have insufficient gain to detect the pen in some regions of a large writing surface. These gain problems can limit the size of the work surface that can be transcribed.

SUMMARY OF THE INVENTION

The present invention includes a pen transcription system and method for using the same. The pen transcription system includes a receiver having first and second acoustical sensors mounted on a planar base and separated from one another, an electromagnetic (EM) detector, and a controller. The first and second acoustical sensors detect an acoustical signal emitted by a moveable signal source. The EM detector detects an EM signal that is synchronized with the acoustical signal. The controller measures the difference in time of detection between the EM signal and the acoustical signals detected by the first and second acoustical sensors. The first and second acoustical sensors each include a detector that generates an electrical signal in response to an acoustical signal in a predetermined frequency range and a housing surrounding the detector, the housing having an aperture defined by an axis. The acoustical sensor has a reception function that is symmetrical about the axis and the axis is substantially perpendicular to the base surface. The controller determines a position for the moveable signal source.

In one aspect of the invention, the receiver is fixed relative to a work surface on which the moveable signal source moves. The receiver can be located on the edge of the work surface or within the work surface so that the receiver detects signals when the moveable signal source is on at locations on all sides of the receiver. The receiver can also include a detector that is utilized by the controller to determine on which of the lines connecting the first and second acoustical sensors the moveable signal source is located. In one aspect of the invention, the detector is an EM detector that is directionally sensitive. In another aspect of the invention, the detector is a third acoustical sensor that is spaced apart from the first and second detectors and located off of the line connecting the first and second detectors. The third acoustical sensor can also be utilized to measure the height of the moveable signal source over the work surface.

In a still further aspect of the invention, one of the first and second acoustical sensors generates a signal that is proportional to the acoustic energy in the auditory acoustical band and the controller outputs a signal related to that signal. This signal can be utilized to record conversations in the vicinity of the receiver together with the position of the moveable signal source to provide a more complete record of a presentation made on the work surface.

BRIEF DESCRIPTION OF THE DRAWINGS

FIG. 3A is a top view of an acoustical sensor on work surface 60.

FIG. 3B is a side view of the acoustical sensor as shown in FIG. 3A.

DETAILED DESCRIPTION OF THE PREFERRED EMBODIMENTS OF THE INVENTION

Figure 1:
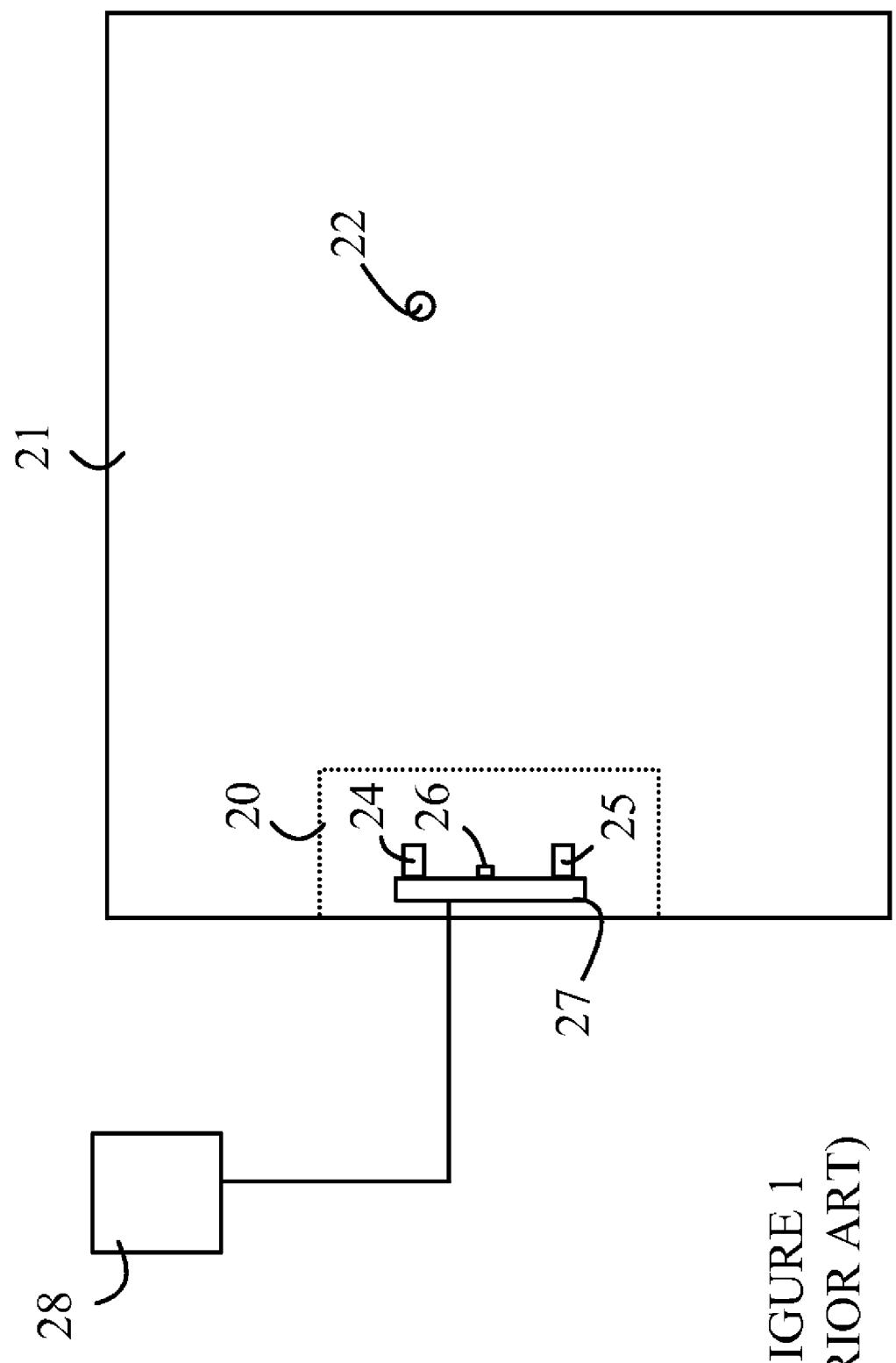
FIG. 1 illustrates a prior art pen transcription system.

The manner in which the present invention provides its advantages can be more easily understood with reference to FIG. 1, which illustrates a prior art pen transcription system. Pen transcription system 20 operates in conjunction with an input device 22 that has a housing that accepts a standard marking pen for writing on a work surface 21 such as a white board. Pen transcription system 20 is attached to one edge of work surface 21. Input device 22 emits both an EM signal and an acoustical signal in response to the user engaging a switch on the input device. Pen transcription system 20 includes an EM receiver 26 and two acoustical receivers, 24 and 25. A controller 27 computes the distance from input device 22 to each of the acoustical receivers by measuring the difference in arrival time between the acoustical signals received at the receivers and the EM signal. The computed position is forwarded to a client device 28 such as a computer for use in recording the material that was written on the work surface.

Figure 2:
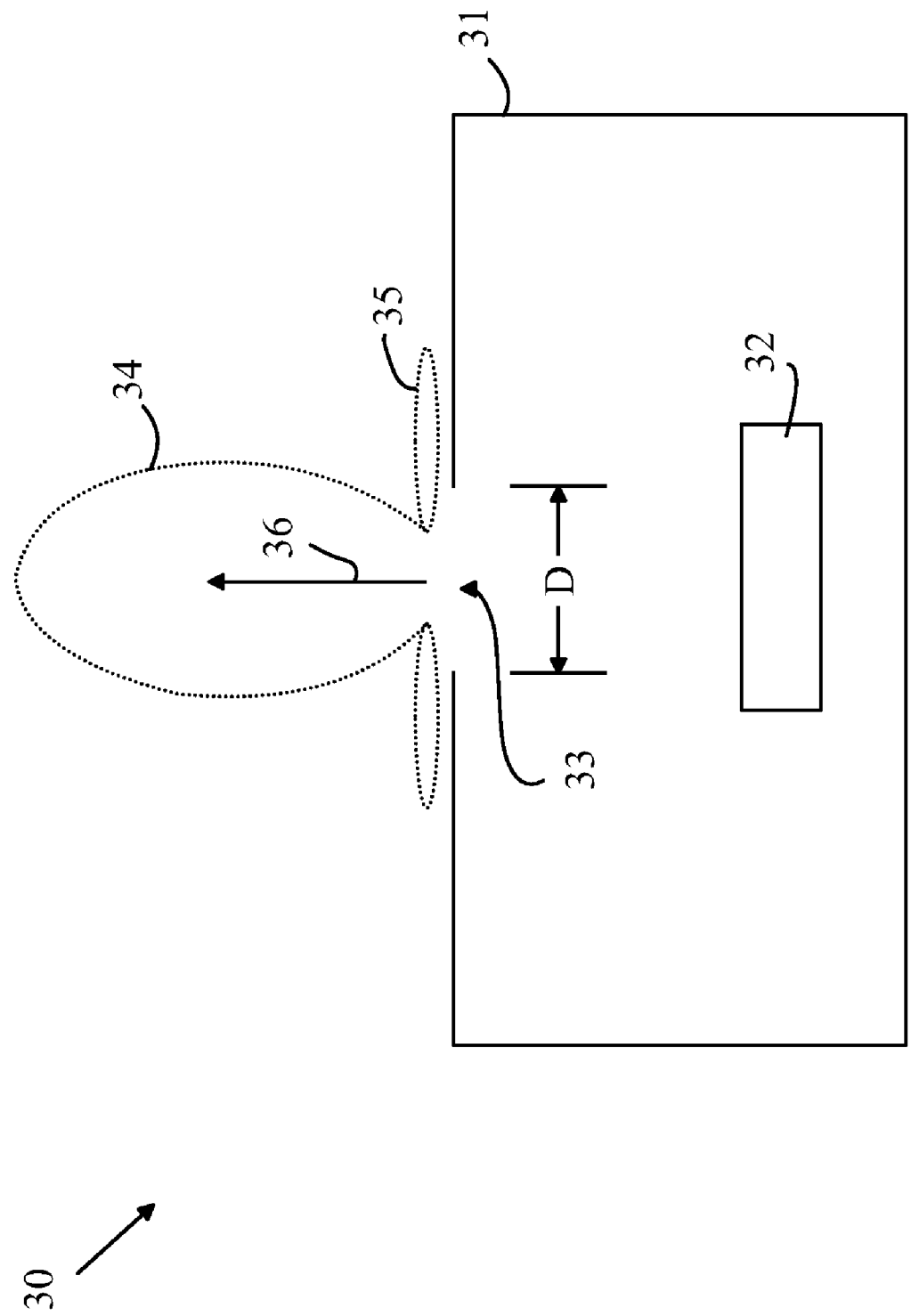
FIG. 2 is a cross-sectional view of an acoustic sensor 30 that can be utilized in a pen transcription system.

Refer now to FIG. 2, which is a cross-sectional view of an acoustic sensor 30 that can be utilized in a pen transcription system. Acoustical sensor 30 includes a housing 31 in which a microphone 32 is located. Housing 31 has an opening 33 having a diameter D. The reception pattern for acoustical sensor 30 depends on the relationship of D to the wavelength, lambda ($\lambda$), of the acoustical signal being detected. The reception pattern for the case in which $D \gg \lambda/(2\pi)$ is shown at 34. It should be noted that the pattern has a main lobe that is shown at 34 and side lobes 35. For an ultrasound signal at 40 kHz in air, $\lambda/(2\pi)$ is approximately 1.4 mm. Prior art devices utilize acoustical sensors in which D is greater than this value, and hence, have reception (and transmission) patterns similar to that shown in FIG. 2. This choice can improve the overall sound detection by increasing the energy that enters the cavity; however, the penalty for this choice is a reception pattern with very high variability as a function of angle. Define the direction normal to opening 33 as the normal direction to the acoustical sensor. This direction is indicated by the arrow shown at 36 in FIG. 2. Prior art pen transcription systems utilize acoustical sensors in which the normal direction is parallel to the work surface. Hence, the sensitivity of the acoustical sensor can vary greatly as a function of the direction of the acoustical signal relative to the normal direction. This can lead to regions of the writing surface in which the pen's position cannot be reliably determined, particularly in the presence of background ultrasound sources such as motion detectors.

One aspect of the present invention is based on the observation that the reception function is only a function of the angle between the normal to the acoustical sensor and the transmitter; hence, if the acoustical sensor is mounted such that the normal to the acoustical sensor is orthogonal to the work surface, the variations in reception gain resulting from a non-uniform reception function can be substantially reduced. Refer now to FIGS. 3A and 3B, which illustrate the manner in which a vertically mounted acoustical sensor provides an improved reception function. FIG. 3A is a top view of acoustical sensor 61 on work surface 60, and FIG. 3B is a side view of acoustical sensor 61 on work surface 60. Referring to FIG. 3B, a non-constant gain function results in the gain of acoustical sensor 61 being a function of angle 67; however, the gain will still be a constant, independent of angle 66 shown in FIG. 3A for any given value of angle 67. In the arrangement shown in FIGS. 3A and 3B, angle 67 is set by the height of the acoustical transmitter 68 in pen 62 and the distance between the acoustical sensor 61 and pen 62. Since the height of transmitter 68 is set by the physical dimensions of the pen and the angle with which the user tilts the pen relative to the work surface, angle 67 is mainly a function of the distance from acoustical sensor 61 to the pen. Furthermore, the variation in angle 67 for various positions on the work surface is much less than the variations of angle 67 over the work surface when the acoustical sensor is mounted with normal 69 parallel to the work surface.

Figure 4:
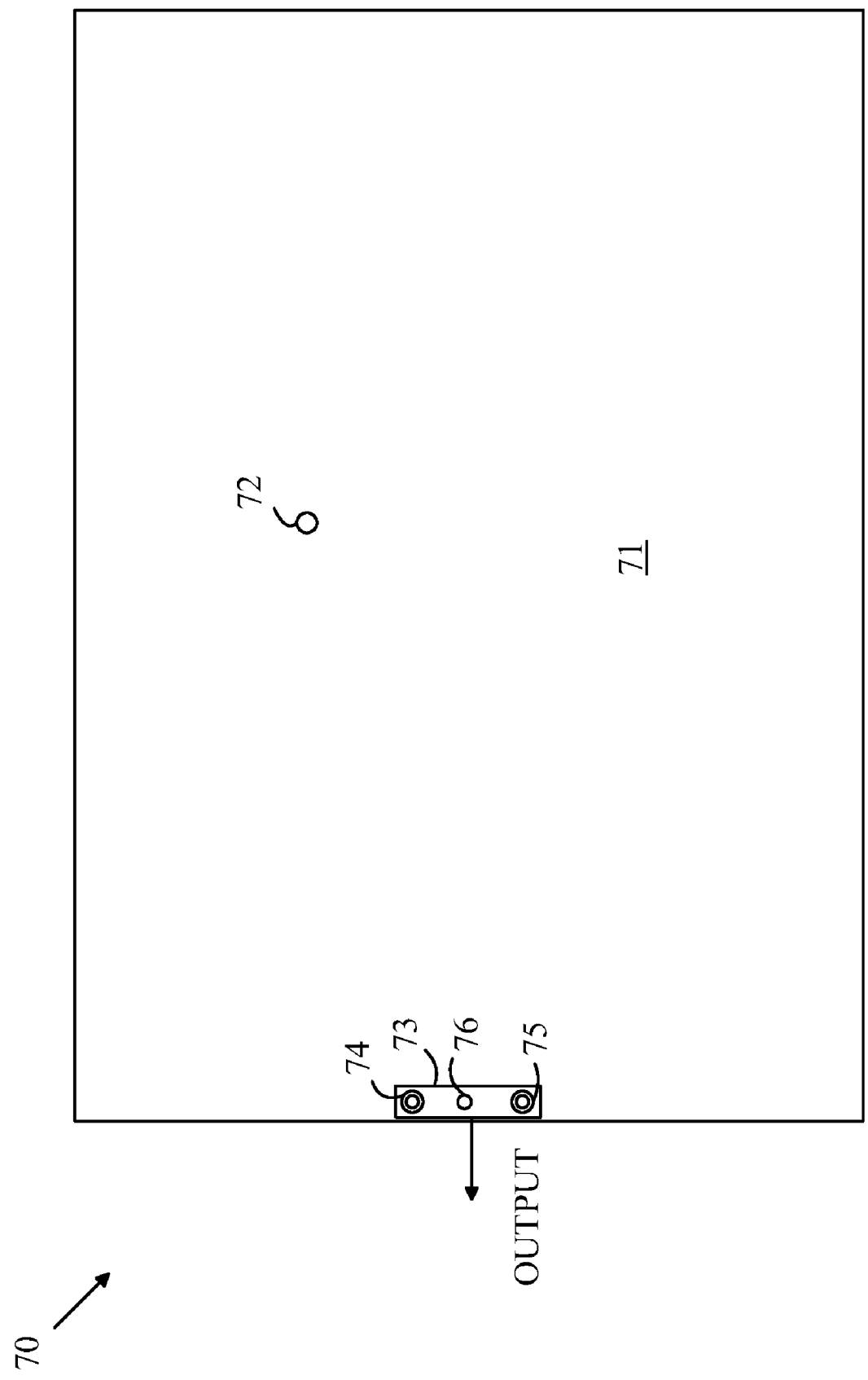
FIG. 4 is a top view of a pen transcription system according to one embodiment of the present invention.

Refer now to FIG. 4, which is a top view of a pen transcription system according to one embodiment of the present invention that utilizes this aspect of the present invention. Pen transcription system 70 tracks the position of a pen 72 on a work surface 71 in a manner analogous to that described above. Pen 72 emits a pair of pulses, an EM pulse in the infrared pulse together with an acoustical pulse. The pulse pairs can be emitted periodically or in response to some event such as the user pressing a button on the pen or the pen being in contact with work surface 71. The pulse pairs are detected by a receiver 73 that includes a first acoustical sensor 74 and a second acoustical sensor 75 that are separated by a predetermined distance and mounted such that the normals of the acoustical sensors are perpendicular to work surface 71. To maximize the size of work surface 71, receiver 73 is typically positioned along the side of work surface 71 at a location that is centered along one edge of work surface 71 such that a line from acoustical sensor 74 to acoustical sensor 75 is parallel to that edge.

Receiver 73 also includes an infrared receiver 76. Receiver 73 determines the distance of pen 72 from each of the acoustical sensors by comparing the time of arrival of the infrared pulse with the acoustical pulse received by each acoustical sensor. The position of pen 72, or information from which the position can be computed, is output by receiver 73, typically to a computer that stores the information and recreates the scene drawn by pen 72 on work surface 71 or takes other actions based on the position motion measurements.

Figure 5:
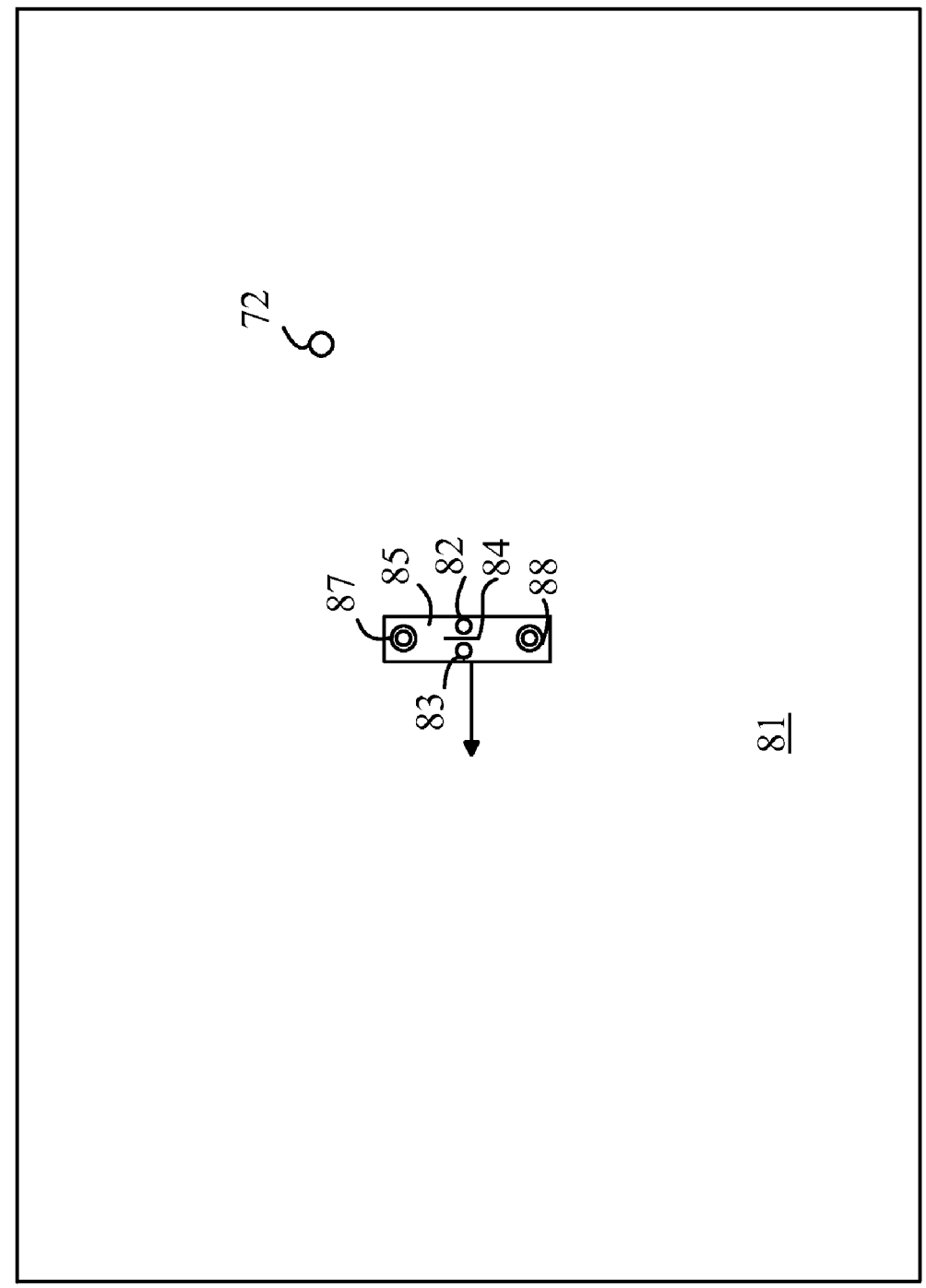
FIG. 5 is a top view of a pen transcription system according to another embodiment of the present invention.

By adding one more infrared or acoustical sensor to the receiver, a pen transcription system having twice the working area can be constructed. Refer now to FIG. 5, which is a top view of a pen transcription system according to another embodiment of the present invention that utilizes this aspect of the present invention. Pen transcription system 80 is similar to pen transcription system 70 discussed above in that pen transcription system 80 includes a receiver 85 having first and second acoustical sensors shown at 87 and 88, respectively, that are mounted such that the normal to each acoustical sensor is perpendicular to work surface 81. Receiver 85 is mounted in the center of work surface 81, and hence, receiver 85 can receive signals from both sides of receiver 85 thereby effectively doubling the size of work surface 81 compared to work surface 71. Receiver 85 includes two infrared receivers 82 and 83. The direction from which each infrared receiver can receive signals is restricted by barrier 84 such that each infrared receiver can only receive signals from one half of the work surface. Hence, the side of the receiver on which the pen is located can be determined.

Figure 6:
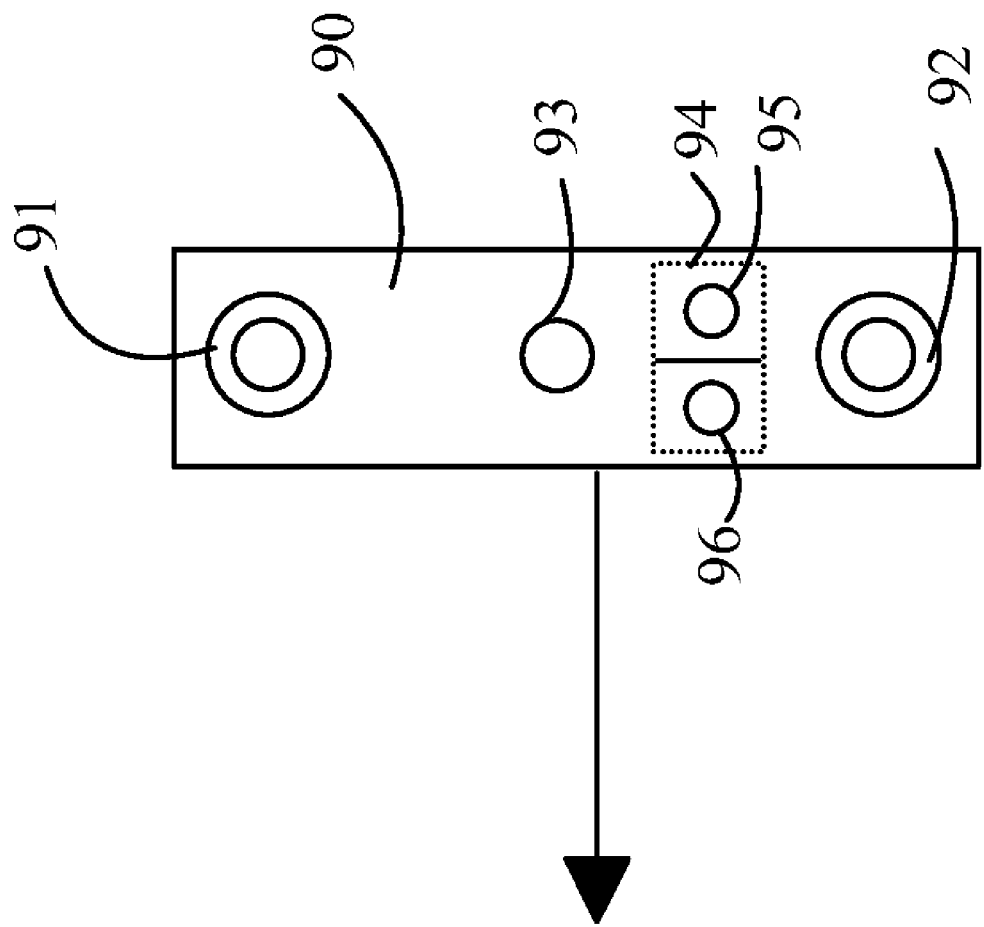
FIG. 6 illustrates a receiver 90 that utilizes one aspect of the present invention.

In the arrangement shown in FIG. 5, the distance computation is carried out using the two acoustical sensors and whichever of the infrared receivers received the signal. However, arrangements in which a single infrared detector is used in the distance computations and a separate directional infrared receiver is used to determine on which side of the receiver the pen is located could also be constructed. Refer now to FIG. 6, which illustrates a receiver 90 that utilizes this aspect of the present invention. Receiver 90 includes acoustical sensors 91 and 92, and an infrared receiver 93 that are used to compute the distance from a pen to each of the acoustical sensors when a pulse pair is received. Infrared receiver 93 can receive signals from both sides of receiver 93. A separate directionally specific infrared detector 94 is used to determine the location of the pen relative to receiver 90. In the embodiment shown in FIG. 6, detector 94 includes two infrared detectors 95 and 96 separated by a barrier that limits the field of view of each infrared detector to one half the work surface on which receiver 90 is placed.

In embodiments that include two infrared detectors that are positioned such that only one of the two detectors receives the infrared signal from the pen at any given time, the signal from the other receiver can be used to enhance the infrared signal detection by providing a measurement of the background infrared noise. Ambient infrared noise is introduced by lighting and other equipment that utilize infrared signaling such as remote controls and infrared communication links used to transfer data between various digital devices. These sources are usually located off of the work surface and at some distance away from the infrared detectors. Hence, each infrared detector receives a background signal that is the same as that received by the other infrared detector.

In one aspect of the invention, the signal from each infrared detector is combined with the signal from the other infrared detector to provide a signal for that detector that is corrected for the common background noise. For example, the controller in the embodiment shown in FIG. 5 could form a first difference signal by subtracting the signal from detector 82 from the signal from detector 83 and a second difference signal by subtracting the signal from detector 83 from the signal from detector 82. One of the difference signals will include a positive signal corresponding to the infrared pulse sent by pen, and the other will include a corresponding negative signal. By examining the difference signals, the controller determines the side of the receiver on which the pen is located.

Figure 7:
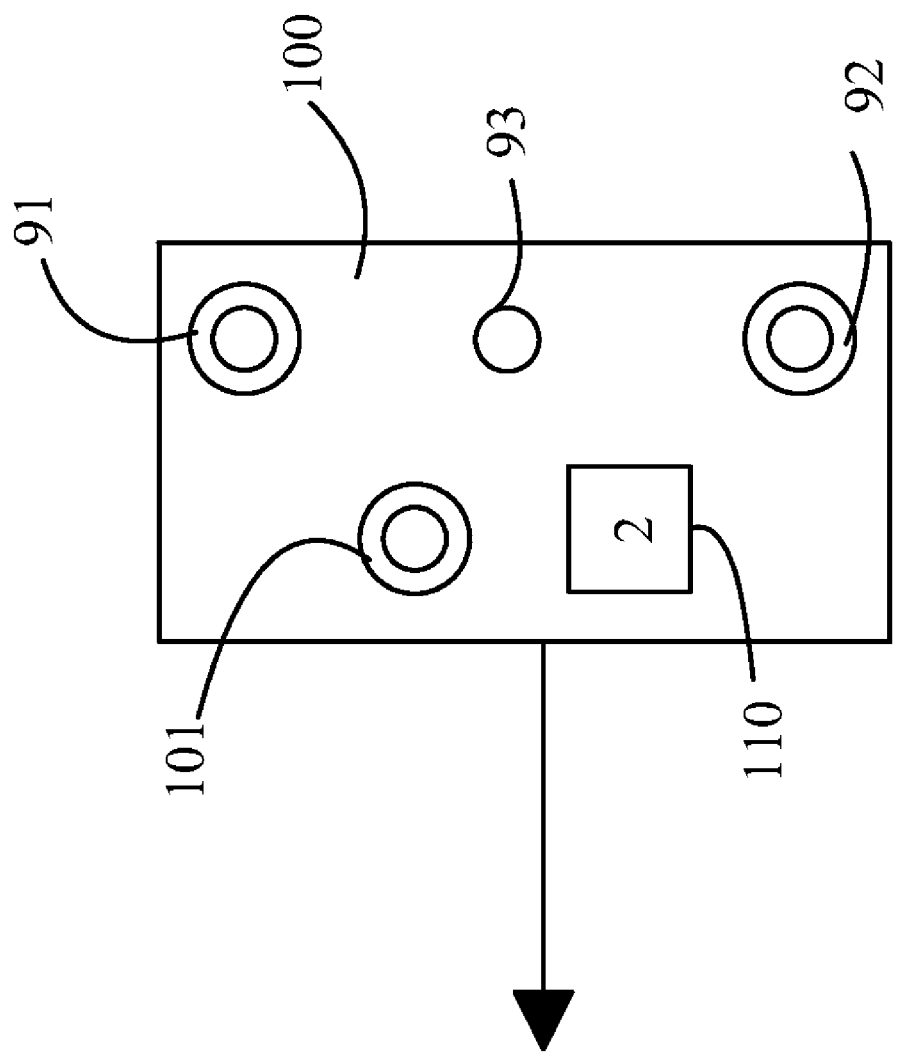
FIG. 7 illustrates a receiver 100 that utilizes another aspect of the present invention.

The above-described embodiments utilize an arrangement in which the direction from which the infrared signal originates is utilized to determine on which side of the receiver the pen is located. However, embodiments that utilize an additional acoustical sensor to provide this information can also be constructed. Refer now to FIG. 7, which illustrates a receiver 100 that utilizes this aspect of the present invention. Receiver 100 includes acoustical sensors 91, 92, and 101 and an infrared receiver 93. The distance from a pen to each of the acoustical sensors is computed using the difference in the time of arrival of the infrared signal and the acoustical signal from the acoustical sensor for each of the acoustical sensors. Since acoustical sensor 101 is not co-linear with acoustical sensors 91 and 92, the distances from the acoustical sensors to the pen and the location of the pen relative to receiver 100 can be uniquely determined from the three distance measurements.

It should also be noted that having a third acoustical detector enables the transcription system to determine the location of the pen in three dimensions. That is, the height of the pen over the work surface can be determined. The height information can be used to determine if the pen is in contact with the work surface or positioned above the work surface. Accordingly, the controller can activate transcription only when the user is actually drawing on the work surface, i.e., the pen is in contact with the work surface or within some predetermined distance from the surface.

The acoustical transmitter in the pen operates at an ultrasound frequency. The precise frequency depends on a number of factors. The frequency should be above the auditory range of human beings and domestic animals that are likely to be within range of the pen when the pen is operating. In addition, the frequency should be different from that of other ultrasound transducers in the area. Such transducers are often used in motion sensing devices that control lighting or burglar alarms. Finally, for any given power level in the pen, higher frequency transmitters tend to have shorter ranges. Hence, pen transcription systems that must measure position over larger work surfaces preferably utilize lower frequencies than pens that are required to operate over small area surfaces. In one aspect of the present invention, the pen includes an ultrasound transducer having a frequency between 30 KHz and 80 KHz, and more particularly between 40 KHz and 80 KHz.

As noted above, the ultrasound frequency is preferably chosen to avoid background ultrasound sources such as those used in motion detectors. In one aspect of the present invention, the controller measures the acoustical spectrum being received by the receivers in the absence of the pen to determine if there are competing ultrasound sources. In such embodiments, the frequency of the ultrasound transducer in the pen can be varied in some predetermined range of frequencies either continuously or discretely. If one or more background sources are detected, the pen is set to a frequency that does not overlap with the background sources in question. The frequency selection can be communicated to the user by the client device shown in FIG. 1 or by a separate frequency indicator on the receiver. For example, receiver 100 shown in FIG. 7 could include a display 110 that displays the frequency channel that the pen is to utilize. The user can then set the pen frequency accordingly.

Figure 8:
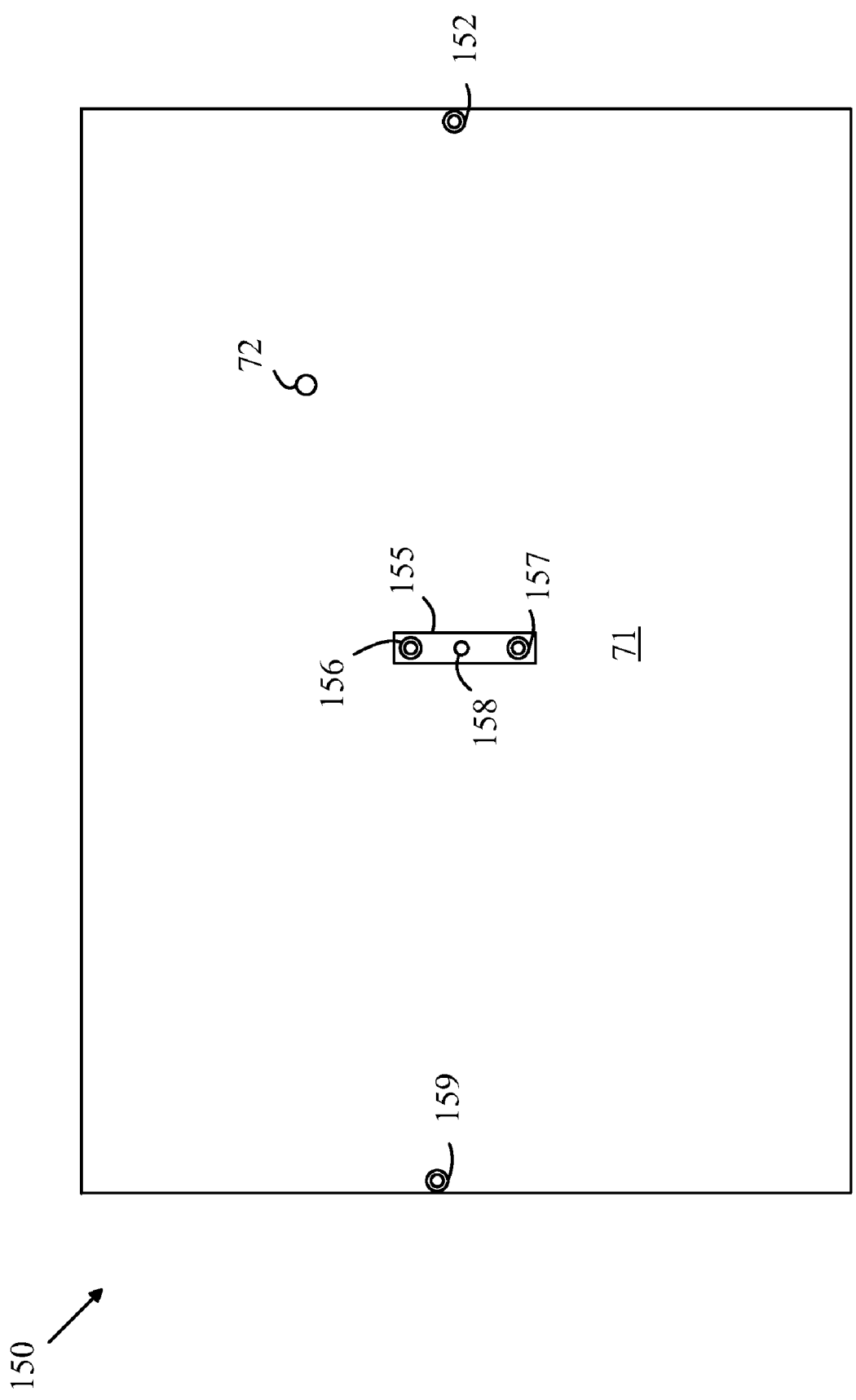
FIG. 8 is a top view of a pen transcription system according to another embodiment of the present invention.

In the above-described embodiments that utilized an additional acoustical sensor to determine the location of the writing implement, the additional sensor was located on the receiver assembly that includes the other two acoustical sensors and the infrared detector. However, embodiments in which the additional acoustical sensor or sensors are located at remote locations with respect to the receiver assembly can also be constructed. Refer now to FIG. 8, which illustrates another embodiment of a pen transcription system according to the present invention. Transcription system 150 includes a receiver 155 that is located in the interior of a work surface 71 and receives signals from a writing implement 72 as described above. Receiver 155 includes two acoustical sensors 156 and 157 and an infrared sensor 158. Transcription system 150 also includes two acoustical sensors, 152 and 159, that are located on the edge of work surface 71. The signals from these sensors are received by the same controller that processes the data from sensors 156-158. To simplify the drawing, the connections from sensors 152 and 159 have been omitted. The signals from one or both of sensors 152 and 159 can be utilized to determine the location of writing implement 72 relative to receiver assembly 155. In addition, the signals from sensors 152 and 159 can also be utilized in determining the position of writing implement 72. It should be noted that one of the acoustical sensors in sensor assembly 155 could be omitted in this embodiment.

In another aspect of the present invention, at least one of the acoustical sensors is sensitive to sound in the auditory frequency range, i.e., 50 to 2000 Hz. The controller utilizes this detector to provide a signal for recording the comments made by individuals within range of this acoustical sensor that can be included in the transcription record with the position of the pen as a function of time. A filter can be implemented, either in hardware or software, to remove sounds outside of this frequency range or a sub-range thereof that is used for the recording function.

The above-described embodiments of the present invention utilize light in the visible or infrared region of the optical spectrum. However, a source that emits EM radiation of other wavelengths could be utilized provided the emitted radiation pattern is directional. Accordingly, the term "light" will be defined to include any directional EM unless a more specific range of wavelengths is indicated.

The above-described embodiments of the present invention have been provided to illustrate various aspects of the invention. However, it is to be understood that different aspects of the present invention that are shown in different specific embodiments can be combined to provide other embodiments of the present invention. In addition, various modifications to the present invention will become apparent to those skilled in the art from the foregoing description and accompanying drawings. Accordingly, the present invention is to be limited solely by the scope of the following claims.

What is claimed is:

1. An apparatus comprising a receiver comprising:
a base having a planar base surface;

first and second acoustical sensors that detect an acoustical signal emitted by a moveable signal source, said first and second acoustical sensors being mounted on said base and separated from one another;

a first EM detector that detects a first EM signal that is synchronized with said acoustical signal; and a controller that measures the difference in time of detection between said first EM signal and said acoustical signals detected by said first and second acoustical sensors;

wherein said first and second acoustical sensors each comprise:

a detector that generates an electrical signal in response to an acoustical signal in a predetermined frequency range;

a housing surrounding said detector, said housing having an aperture defined by an axis, wherein said acoustical sensor has a reception function that is symmetrical about said axis, said axis being substantially perpendicular to said base surface.

2. The apparatus of claim 1 wherein said controller determines a frequency in said predetermined frequency range to be utilized by said moveable signal source based on a measurement of acoustical energy as a function of frequency in said predetermined frequency range in the absence of said moveable signal source.

3. The apparatus of claim 1 wherein said controller determines a position for said moveable signal source.

4. The apparatus of claim 1 wherein said receiver is fixed relative to a work surface on which said moveable signal source moves.

5. The apparatus of claim 4 wherein said receiver is located on an edge of said work surface.

6. The apparatus of claim 4 wherein said receiver is located at a point that is internal to said work surface, said moveable source being located on either side of a line joining said first and second acoustical sensors, and wherein said receiver comprises a detector that is utilized by said controller to determine on which of said line connecting said first and second acoustical sensors said moveable signal source is located.

7. The apparatus of claim 6 wherein said detector comprises an acoustical sensor located proximate to an edge of said work surface.

8. The apparatus of claim 7 wherein said detector is also utilized in determining a position for said moveable source.

9. The apparatus of claim 6 wherein said detector is a second EM detector.

10. The apparatus of claim 9 wherein said controller combines signals from said first and second EM detectors to generate a timing signal that is corrected for background EM noise that is common to both of said first and second EM detectors.

11. The apparatus of claim 6 wherein said detector is a third acoustical sensor that is separated from said first and second acoustical sensors and located off of said line connecting said first and second acoustical sensors.

12. The apparatus of claim 11 wherein said controller determines a height of said moveable signal source above said work surface.

13. The apparatus of claim 1 wherein one of said first and second acoustical sensors generates a signal that is proportional to the acoustic energy in the auditory acoustical band and said controller outputs a signal related to that signal.

14. A method for determining the position of a moveable signal source on a work surface, said method comprising:

providing a receiver at a fixed location on said work surface, said receiver comprising first and second acoustical sensors that detect an acoustical signal emitted by said moveable signal source, said first and second acoustical sensors being mounted on said work surface and separated from one another; and a first EM detector that detects a first EM signal that is synchronized with said acoustical signal; and measuring the difference in time of detection between said first EM signal and said acoustical signals detected by said first and second acoustical sensors;

wherein said first and second acoustical sensors each comprise:

a detector that generates an electrical signal in response to an acoustical signal in a predetermined frequency range;

a housing surrounding said detector, said housing having an aperture defined by an axis, wherein said acoustical sensor has a reception function that is symmetrical about said axis, said axis being substantially perpendicular to said work surface.

15. The method of claim 14 further comprising measuring the acoustical energy in said predetermined frequency range in the absence of said moveable signal source and communicating a frequency in said predetermined frequency range at which said moveable signal source is to transmit said acoustical signal based on said energy measurement.

16. The method of claim 14 further comprising determining a position for said moveable signal source on said work surface.

17. The method of claim 14 wherein said receiver is located on an edge of said work surface.

18. The method of claim 16 wherein said receiver is located at a point that is internal to said work surface, said moveable source being located on either side of a line joining said first and second acoustical sensors, and determining said position comprises determining on which side of a line connecting said first and second acoustical sensors said moveable signal source is located.

19. The method of claim 18 wherein determining on which side of said line said moveable signal source is located comprises detecting said EM signal in a detector that provides different signals when said moveable source is located on different sides of said line.

20. The method of claim 19 further comprising combining signals from said first detector and a second EM detector to generate a corrected EM signal that is corrected for background EM noise that is common to both of said first and second EM detectors.

21. The method of claim 18 wherein determining on which side of said line said moveable signal source is located comprises detecting said acoustical signal in a third acoustical sensor.

22. The method of claim 21 further comprising determining the height of said moveable source above said work surface.

23. The method of claim 14 further comprising recording a signal related to an output of one of said acoustical sensors in an auditory frequency band.

* * * * *